Patented Oct. 31, 1950

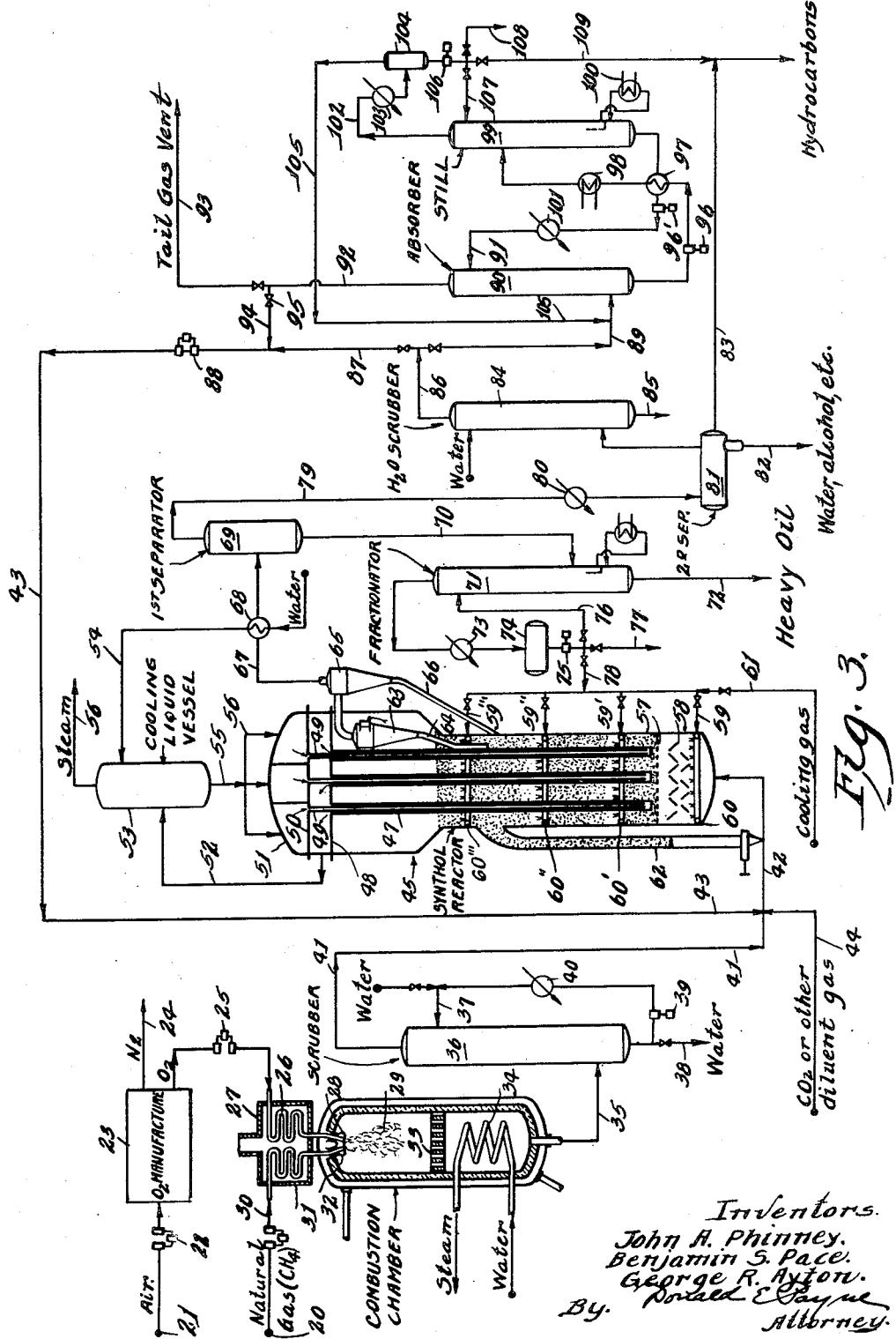

2,527,846

UNITED STATES PATENT OFFICE 2,527,846

HYDROGEN-CARBON MONOXIDE SYNTHESIS

John A. Phinney and Benjamin S. Pace, Tulsa, and George R. Ayton, Pryor, Okla., assignors to Stanolind Oil and Gas Company, Tulsa, Okla., a corporation of Delaware Application January 14, 1947, Serial No. 722,065

3 Claims. (Cl. 260—449.6)

This invention relates to hydrogen-carbon monoxide synthesis, i. e. to the reaction of hydrogen with carbon monoxide to produce hydrocarbons and oxygenated organic compounds, and it pertains more particularly to improved methods and means for effecting such synthesis with fluidized catalyst of the iron type.

It is known that when hydrogen-carbon monoxide gas mixtures are contacted with fluidized iron catalysts at temperatures in the range of 550–675° F. and pressures in the range of 150 to 350 pounds per square inch, hydrocarbons of more than two carbon atoms per molecule may be synthesized along with a certain amount of oxygenated organic compounds. Many problems, however, have stood in the way of the commercial feasibility of such processes. For some unexplainable reason the catalyst during a run was found to "lose turbulence" or become defluidized and no variation in vertical gas velocity could reestablish the desired turbulent fluidized condition. The catalyst particles in such cases appeared to "set" and the upwardly flowing gas to channel. An important object of this invention is to provide a method and means for preventing this loss of fluidization.

A very important problem was that of directing the synthesis reaction toward the formation of desired products. An object of this invention is to provide methods and means for preventing conversion of carbon monoxide to carbon dioxide, for promoting the formation of water as an oxygenated product instead of $CO_2$, for obtaining liquid or condensible hydrocarbon products instead of methane, and for avoiding excessive carbonaceous deposits on the catalyst. A further object is to produce from a given amount of methane (natural gas) maximum yields of gasoline components and materials readily convertible to high quality gasoline by known auxiliary processes such as polymerization, alkylation, catalytic refining, etc.

The hydrogen-carbon monoxide mixture employed for synthesis conversion, i. e. the so-called synthesis gas or "make gas," may be produced in a wide variety of ways from a wide variety source of materials. An object of this invention is to provide an improved correlation between the synthesis gas preparation and the synthesis operation per se whereby maximum utilization can be obtained of both the hydrogen and carbon monoxide contents of the synthesis gas. With methane as a source of the carbon component, the object is to react it with oxygen to produce a maximum yield of hydrogen and carbon monoxide in about a 1.8:1 to 2:1 ratio and to utilize this charge substantially quantitatively in the synthesis conversion step. Other objects will be apparent as the detailed description of the invention proceeds.

In practicing the invention undue amounts of nitrogen in the synthesis gas may be avoided by using relatively pure oxygen instead of air for effecting the synthesis gas production. By separately preheating the oxygen and methane streams to at least about 1000° F. and then effecting direct partial combustion under a pressure in the range of about 200 to about 300 p. s. i. and at a temperature of at least about 2200° F., and by using about 10% excess oxygen in the combustion step a synthesis gas can be obtained of which 90 to 95% consists of hydrogen and carbon monoxide in the ratio of about 1.8:1 to 2:1, the balance, exclusive of nitrogen, being chiefly unconverted methane and carbon dioxide (the water formed being removed from the synthesis gas by a scrubbing operation). The synthesis gas can of course be obtained from known reformer operations or by any other known processes employing such raw materials as carbon, carbon dioxide, hydrocarbons, steam, and other materials containing carbon and/or oxygen.

It has been found that if synthesis gas containing about 30 to 35% carbon monoxide is charged to the synthesis step as produced, an active synthesis catalyst becomes defluidized and the process is rendered practically inoperative. Unexpectedly it has been discovered that by properly limiting the carbon monoxide content of the gas charged to the synthesis step, the catalyst does not become defluidized but on the contrary remains remarkably effective for long periods of time in producing the desired results. The limiting of the carbon monoxide content is best effected by admixing with the make gas certain amounts of one or more inert gas diluents, preferably by recycling certain materials such as tail gas recovered from other parts of the system. The total gas charge introduced at the base of the synthesis reactor should contain less than 15 mol percent and preferably not more than about 12 mol percent of carbon monoxide during normal operation. When starting up with very active catalyst it is essential that the percent of carbon monoxide in the total inlet gas be relatively small; for such catalyst it is best to start with a gas containing only about 2% of carbon monoxide and then to gradually increase the carbon monoxide content over a period of hours until the limiting value of about 10% is reached although this limiting value in some case may be as low as about 8 or 9% and in other cases may be as high as about 15%. When starting up with a relatively inactive catalyst the full amount of carbon monoxide may be used in the synthesis gas from the very beginning.

The nature of the diluent gas is also of great importance. For optimum conversion the synthesis reaction should be substantially:

$$nCO + 2nH_2 \rightarrow (CH_2)_n + nH_2O$$

In other words, production of $CO_2$ should be eliminated as far as possible. It appears that the relation between CO, $H_2$, $CO_2$ and $H_2O$ from the synthesis reactor is dictated by the water-gas equilibrium:

$$CO + H_2O \rightleftarrows H_2 + CO_2$$

$$\frac{(CO_2)(H_2)}{(CO)(H_2O)} = K = ca\ 25$$

Thus, with a given conversion of CO and a corresponding necessary elimination of oxygen as $CO_2$ or $H_2O$, the addition of excess $CO_2$ or $H_2$ in the reactor feed will favor the production of $H_2O$ over $CO_2$, such that no net conversion of CO to $CO_2$ will result.

The best source for such excess $CO_2$ or $H_2$ is the tail gas from the synthesis reaction and whether or not such tail gas predominates in $H_2$ or $CO_2$ depends to a considerable extent on the nature of the synthesis gas or make gas employed. With optimum make gas containing an $H_2$:CO ratio of about 1.8:1 to 2:1, the diluent gas is chiefly carbon dioxide which is preferable as a diluent because excessively large amounts of hydrogen in the synthesis reactor tend to promote the formation of methane at the expense of higher boiling hydrocarbons.

For optimum synthesis conversion it is important to maintain in the reactor charge a rather closely defined $H_2$:CO:$CO_2$ ratio. This ratio should be approximately 3:1:2 although it may vary within the range 2–6:1:1–3. When the amount of hydrogen is relatively large the amount of carbon dioxide may be relatively small and vice versa and the relationship between such amounts and the amount of carbon monoxide may be expressed by the equation $$\frac{(H_2)(CO_2)}{(CO)^2} = Z$$

where Z has a numerical value of about 6, i. e. within the range of about 3 to 9. In other words, the mol or volume percent of $H_2$, CO and $CO_2$ in the total feed gas entering the synthesis reactor should be in the ratio of 2–6:1:1–3 and the amounts should also be such as to give a value for Z of approximately 6 in the above equation. As above indicated, the volume or mol percent of CO in the synthesis reactor charge should be below 15% and preferably not more than about 12% and with only a small amount of nitrogen present may be of the order of about 10%. The 3:1:2 ratio will thus mean that the charge should contain approximately 30% hydrogen, 10% carbon monoxide and 20% carbon dioxide giving a Z number of about 6. If the charge contains 60% hydrogen and 10% carbon monoxide it need only contain about 10% carbon dioxide for the same Z number. If the charge contains only 25% hydrogen and 10% carbon monoxide it will have to contain about 24% carbon dioxide for a Z number of 6. As above stated, the Z number for optimum operations should be within the range of about 3 to 9. The balance of the make gas may be nitrogen, methane, ethane, etc., but such make gas should be substantially free from water.

The total make gas is passed upwardly through a fluidized mass of iron catalyst at a temperature in the range of 550 to 675° F., e. g., about 600° F. at a pressure in the range of 150 to 350 p. s. i., e. g., about 250 p. s. i. and at a space velocity equivalent to charging about 5 to 15, e. g., about 10 cubic feet of carbon monoxide per hour per pound of iron catalyst in the synthesis conversion zone. Throughout this specification all gas volumes are those measured at atmospheric pressure and 60° F. and all gas percentages unless otherwise specified are on a mol or volume percent basis.

The synthesis reaction is highly exothermic and it is important that the temperature within the reaction zone be held within rather narrow limits. Vertical heat exchange tubes may be employed for removing the bulk of the heat of reaction provided that the tube surfaces be spaced from each other by about at least 2 or 3 inches (to avoid interference with catalyst fluidization and necessary turbulence) and provided that the minimum temperature of the tube surfaces be of the order of 500° F. At least a portion of the cooling may be effected by contacting a portion of the catalyst with incoming feed gases in order to preheat them to a conversion temperature. A portion of the cooling may be effected by introducing a relatively cool inert gas at a plurality of points in a synthesis zone or by spraying into said zone a vaporizable liquid such as a hydrocarbon product component which boils below conversion temperature prevailing in the synthesis zone. If such liquid is employed it should be sprayed into the fluidized catalyst in very finely divided form so that minute droplets may be suspended in the upflowing gas stream in much the same way as catalyst particles are suspended therein; the catalyst particles quickly collide with and are partially wetted by the liquid droplets and there should not be a sufficient mass of liquid at any point to cause catalyst agglomeration by an undue wetting of the catalyst particles.

Catalyst particles are separated from the gases and vapors in the upper part of the synthesis reaction zone and the substantially catalyst-free gases and vapors are then cooled to effect at least partial condensation of product fractions which are substantially higher boiling than water. The uncondensed portion of the reactor effluent stream may then be fractionated in any conventional manner to separate aqueous from hydrocarbon products and to remove unreacted hydrogen, carbon dioxide, methane, etc. as a tail gas a portion of which is vented for effecting a nitrogen purge and another portion of which (substantially free from water) is preferably recycled to form a component of the total synthesis gas charged to the synthesis conversion zone. The optimum amount of gas thus recycled may be about twice the amount of fresh synthesis gas produced by partial oxidation of methane with pure oxygen as hereinabove described.

The invention will be more clearly understood from the following description of a specific example thereof read in conjunction with the accompanying drawings which form a part of this specification and in which:

Figure 3 is a schematic flow diagram of a commercial synthesis plant for producing approximately 4000 to 5000 barrels per day of liquid and condensible hydrocarbons.

Figure 1:
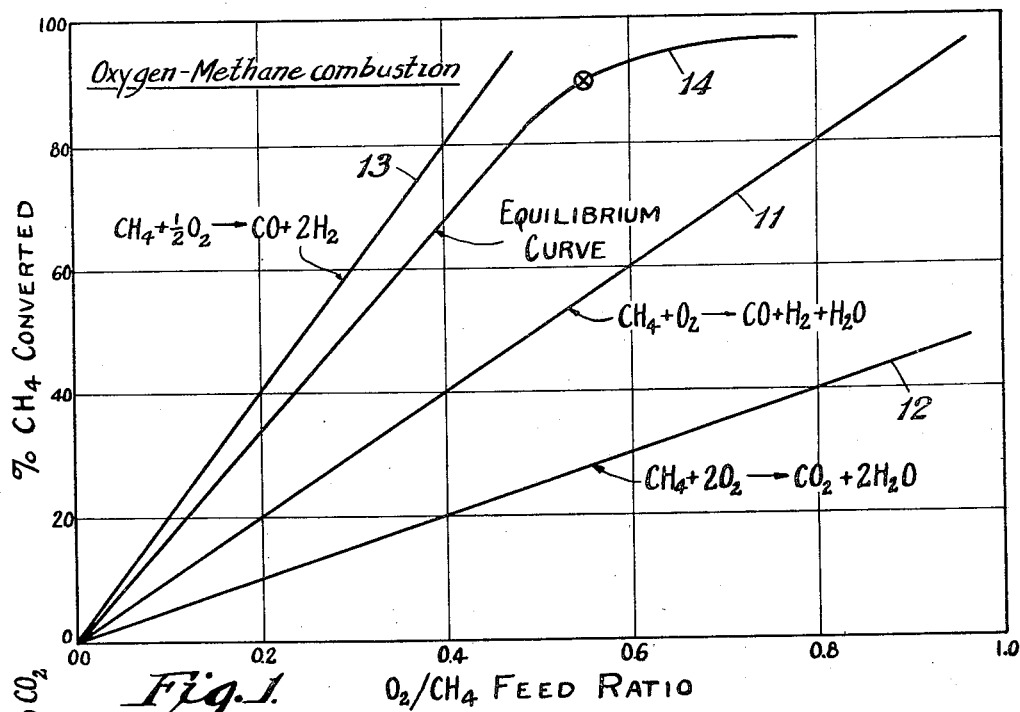
Figure 1 is a graph illustrating possible reactions in the methane oxidation step and the equilibrium product composition obtained.

Referring first to Figure 1, the graph thereby presented shows the correlation between the percent conversion of methane and the ratio of oxygen and methane in the feed gases to a combustion chamber. Extensive investigation has shown that the primary reaction in the combustion is that illustrated by curve 11 and that oxygen reacts preferentially with methane in the presence of hydrogen and carbon monoxide. Complete combustion indicated by curve 12 is substantially avoided by effecting the combustion with an amount of oxygen which is only slightly, e. g. about 10%, in excess of that required to produce only carbon monoxide and hydrogen as shown in curve 13. By effecting the combustion at a temperature of the order of 2300° F. some of the water produced by the reaction of curve 11 evidently reacts with methane to give one mol of carbon monoxide and 3 mols of hydrogen. From equilibrium curve 14 it will be seen that for maximum methane conversion to $H_2$ and CO, the oxygen:methane feed ratio should be at least about .5 to about .6 so that for practical purposes a ratio of about .55 should be used, this corresponding to about 55 mols of oxygen per 100 mols of methane. The resulting partial oxidation products after removing water will constitute about 90 to 95% hydrogen and carbon monoxide in the ratio of about 1.8:1 to 2:1.

Figure 2:
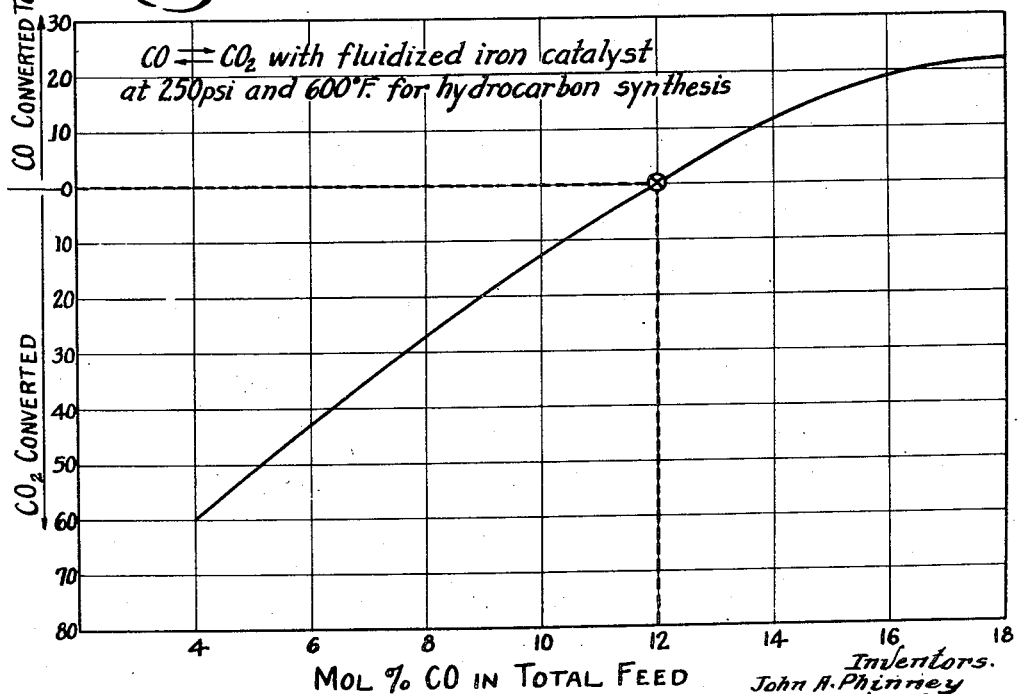
Figure 2 is a graph showing the net production or consumption of $CO_2$ as a function of the CO content of a total synthesis gas feed, said CO content being varied by adjusting the recycle ratio of tail gas (containing $H_2$, $CO_2$ and methane) to fresh feed gas.

In Figure 2 the relationship is shown between the mol percent of carbon monoxide in total synthesis gas feed and the net consumption or production of carbon dioxide. The fresh feed component of the total feed in the example illustrated by Figure 2 was produced by reforming methane with steam and carbon dioxide and it contained about 5% $CO_2$, 17% CO, 71% $H_2$, 5% $CH_4$ and 2% $N_2$. It is known that with a high mol percent of carbon monoxide in the total feed, e. g. an amount of the order of 20 to 30%, almost as much of the carbon monoxide is converted to carbon dioxide as is converted into useful products. As the mol percent of carbon monoxide is decreased from about 17% down to about 12% by recycle of more and more tail gas containing large amounts of $H_2$ and $CO_2$ but relatively small amounts of CO and $H_2O$, the conversion of CO to $CO_2$ in the synthesis zone decreases from about 22% to 0% with a corresponding increase in the conversion of CO to hydrocarbons. When the carbon monoxide content of the total synthesis reactor feed is still further lowered, there is actual conversion of $CO_2$ to hydrocarbons. Conversion of $CO_2$ is undesirable because of its unduly high heat of reaction and its excessive consumption of hydrogen. Conversion of CO to $CO_2$ is undesirable because it decreases the total yield of hydrocarbons from a given synthesis gas containing $H_2$ and CO in a ratio of at least about 2:1.

In general the optimum conditions include (1) the use in the total synthesis gas feed of an amount of carbon monoxide sufficiently small to prevent defluidization difficulties and to provide for maximum conversion to hydrocarbons, (2) an $H_2$:CO:$CO_2$ ratio of about 3:1:2 or within the range of 2–6:1:1–3 and (3) a Z number of approximately 6, i. e. within the range of about 3 to 9. The precise amount of carbon monoxide in the total synthesis gas for optimum conditions will depend to a considerable extent on the nature of the fresh feed gas or make gas which is available. If such fresh feed gas contains $H_2$ and CO in a ratio below about 1.8:1 so that there is an actual hydrogen deficiency for maximum conversion to hydrocarbons, then the optimum mol percent of carbon monoxide in the total synthesis gas feed may be somewhat greater than 12%, e. g. about 13 to 15%. If such fresh feed gas contains $H_2$ and CO in a ratio of 4:1 or more so that there is a deficiency of CO for maximum conversion to hydrocarbon products, then the optimum mol percent of carbon monoxide in the total synthesis gas feed may be lower than 12% and even as low as 8 to 10%. Generally speaking, however, the three requirements hereinabove specified define the optimum total charging stock composition.

As examples of how such total feed gas can be obtained by recycling tail gas operations employing reformer fresh feed and partial combustion fresh feed respectively, (assuming absence of nitrogen), the following tables are illustrative:

|  | Operation With $H_2$-Rich Reformer Fresh Feed | | |
|---|---|---|---|
|  | Fresh Feed | Tail Gas Recycle | Total Feed (1.2:1 recycle) |
| $H_2$ | 68 | 57 | 62 |
| CO | 20 | 3 | 10+ |
| $CO_2$ | 7 | 15 | 11+ |
| $CH_4$, etc. | 5 | 25 | 17 |
| $H_2$:CO:$CO_2$ ratio | 3.4:1:0.35 | 19:1:5 | 6:1:1 |
| Z number | 1.2 | 95 | 6.8 |

|  | Operation With Partial Combustion Fresh Feed | | |
|---|---|---|---|
|  | Fresh Feed | Tail Gas | Total Feed (2:1 recycle) |
| $H_2$ | 62 | 24 | 37 |
| CO | 33 | 3 | 13 |
| $CO_2$ | 3 | 35 | 24 |
| $CH_4$, etc. | 2 | 38 | 26 |
| $H_2$:CO:$CO_2$ ratio | 1.9:1:0.1 | 8:1:12 | 3:1:2 |
| Z number | 0.17 | 94 | 5 |

Figure 3 schematically shows a flow diagram of a snthol unit designed to produce about 4000 to 5000 barrels per day of liquid and condensible hydrocarbon product. In this system the raw materials are natural gas from source 20 and air from source 21. About 175,000,000 cubic feet per day of air is compressed by compressor 22 to about 75 pounds per square inch and passed through an oxygen production system 23 of the modified Linde-Frankl type for producing about 28,000,000 cubic feet per day of relatively pure oxygen, the nitrogen being vented from the system through line 24. Briefly the air is passed through a heat exchanger and cooled to about −275° F. by indirect countercurrent contact with cold product gases. About four-fifths of this cold air is efficiently fractionated at very low temperature to separate oxygen from nitrogen, the reflux or cooling necessary for effecting this fractionation being supplied by expanding about one-fifth of the cold air at low pressure through an efficient air exchanger. The final oxygen product stream as well as nitrogen and expanded air are used in the initial countercurrent heat exchanger for effecting the regeneration and the direction of flow through the heat exchanger is periodically reversed so that any impurities which might condense out on exchanger tubes are blown out with nitrogen and exit gases. By this means about 28,000,000 cubic feet per day of pure oxygen can be produced. It should be understood that this relatively pure oxygen may be produced by any other known process and since this step per se forms no part of the present invention it will not be described in further detail.

The 28,000,000 cubic feet per day of oxygen is passed by compressor 25 through preheater coils 26 in furnace 27 to nozzle 28 which may be jacketed at its discharge end or made of refractory material in combustion chamber 29. Similarly about 50,000,000 cubic feet per day of methane is introduced by line 30 through preheating coils 31 to nozzle 32 which extends into combustion zone 29 adjacent nozzle 28 and which is likewise jacketed at its discharge end or constructed of refractory material. The methane, when obtained as a natural gas, may already be at the desired pressure of about 250 to 300 p. s. i., otherwise a compressor will raise it to such pressure. If the methane contains substantial amounts of sulfur it may be pretreated by known means for sulfur removal. In the preheating step both the methane and the oxygen are raised to a temperature of approximately 1000° F. or more, i. e. to temperatures as high as are feasible in available equipment without impairing either the charge materials or the equipment.

The combustion zone 29 may be a hollow vessel provided with a refractory lining of zirconia or other suitable material heavily insulated and preferably water-jacketed. Partial combustion of the methane with the oxygen takes place in the upper portion of the combustion zone and in the lower portion thereof, below baffles 33, heat exchange tubes 34 may be employed for converting water into high pressure steam or for any other purpose. If combustion chamber 29 is heated for example by electrical means to maintain the temperature therein above 2200° F. and preferably at least about 2300° F. no preheating of the gases will be required but it is important in the absence of catalyst that the combustion be effected at a temperature of at least 2200° F. in order to obtain the desired $H_2$:CO ratio and to avoid formation of carbon or coke. The temperature of the partial combustion zone 29 may be materially lowered by employing suitable catalysts in the combustion zone and although many such catalysts are known to the art, such as nickel mounted on firebrick, experience has shown that they are subject to fouling by carbon deposits or otherwise so that the thermal process now appears most advantageous. The composition of the gaseous stream leaving combustion chamber 29 may be approximately as follows on a volume or mol percent basis (excluding nitrogen and after condensation of water):

| | Per cent |
|---|---|
| Unreacted methane | 2 |
| carbon dioxide | 3 |
| $H_2$ | 62 |
| CO | 33 |
| $H_2$:CO ratio | 1.9 |

The raw synthesis gas is then passed by line 35 to scrubber 36 wherein it is scrubbed by water introduced through line 37 for condensing and removing the water produced in the partial combustion step and for removing any carbon particles which may be entrained in the gas. The net water production is removed through line 38 and water is continuously recycled by pump 39 in cooler 40 back to the top of the tower. If the charging stock for the combustion zone was not substantially free from sulfur the dried gases may be desulfurized at this stage in the process by any known means for sulfur removal.

The raw synthesis gas from the top of scrubber 36 is passed by line 41 to reactor feed line 42 and into the reactor feed line a diluent gas is introduced through either line 43 or line 44. In starting up the process with a very active catalyst the total feed gas should have a very low concentration of carbon monoxide, for example about 1 to 5%. This low concentration may be obtained by changing conditions in combustion zone 29 to make gas of low carbon monoxide content and high $CO_2$ content or by adding a diluent gas, such as carbon dioxide, from such external point as line 44. The carbon monoxide content of the total reactor charge may be gradually increased from about 2% to about 12% over a period of 2 to 20 hours or more. During normal operation however the synthesis gas step is operated under conditions above described and approximately 2 volumes of diluent gas is introduced by recycle in the synthol system per se. The total reactor charge will thus be approximately as follows on a nitrogen-free basis:

| Component | Mol Per cent in— | | |
|---|---|---|---|
| | Fresh feed | Recycle | Total synthesis feed |
| Hydrocarbon | 2 | 38 | 26 |
| $CO_2$ | 3 | 35 | 24 |
| $H_2$ | 62 | 24 | 37 |
| CO | 33 | 3 | 13 |

This total synthesis feed is passed upwardly through a fluidized dense-phase turbulent mass of finely divided iron catalyst particles in reactor 45. The iron catalyst may be prepared in any known manner, for example, pure iron may be burned in a stream of oxygen, the oxide ($Fe_3O_4$) may be fused, ground to desired particle size, reduced and used as usch. Promoters may be added to the mass undergoing fusion such for example as a small amount of silicon, alumina, titania, or alkali metal.

A preferred method of catalyst preparation is to admix hematite ($Fe_2O_3$) with about 2% or more potassium carbonate, heat the mixture to a temperature above 1000° C., i. e. to effect incipient fusing or sintering, and to convert the iron oxide to $Fe_3O_4$, extract excess potassium from the sintered mass with water so that only about 1 to 2%, e. g. about .5% potassium will remain, reduce the $Fe_3O_4$ containing the residual potassium by treatment with hydrogen for a period of hours at a temperature of about 600 to about 1000° F. and grind the reduced particles to desired particle size. Alternatively the grinding step may precede the reduction step and the reduction may be effected while the solids are fluidized in an upflowing hydrogen stream but in this case the reduction temperature should not exceed about 700 to 800° F. and for sufficient reduction it may require a period of 10 to 30 hours or more. It is unnecessary that the catalyst be completely reduced and in fact complete reduction or long contact with hydrogen appears to result in chemically adsorbed hydrogen which renders the catalyst extremely active and which makes it even more necessary to initiate the reaction with a low carbon monoxide content in the entering gas stream. Although the precise chemical nature of the catalyst particles cannot be defined with precision it appears to be a mixture of reduced Fe and FeO and in the synthesis zone a portion thereof is converted to $Fe_2C$. Potassium stabilizes the state of reduction of the iron and may be initially added as a carbonate as above described or as a fluoride or other salt or oxide such, for example, as KF. When sodium is employed instead of potassium as a stabilizer it should be used in much smaller amounts, usually about $\frac{1}{10}$ as much as in the case of potassium. Small amounts of other materials or metal oxides may be employed with the catalyst in manners and for purposes well known to the art.

It is important not only that the catalyst be of proper chemical composition and structure but also that it be of a physical form which will enable fluidization. The particle size of the catalyst should be chiefly in the range of about 1 to 200 microns and preferably in the range of about 2 to 100 microns and for optimum results the particles should be of indiscriminate or different sizes rather than uniformly sized. The bulk density of the compacted catalyst particles may be about 100 to 150 pounds per cubic foot but when fluidized by the upward passage of gases at the rate of about 1 to 3 feet per second, preferably 1½ to 2 feet per second, the fluidized density is below about 90 pounds per cubic foot and may range from about 25 to 75 pounds or of the order of 50 pounds per cubic foot. With extended use the catalyst particles appear to pick up carbon or carbonaceous deposits which markedly decreases their density. In expressing space velocities, the term "catalyst" is used to refer to the iron content thereof regardless of any carbon deposits that may be carried thereby. Under properly controlled conditions a catalyst may be operated for long periods of time without regeneration but if and when the catalyst becomes inactive or becomes coated with excessive amounts of carbonaceous material it may be regenerated by oxidation to remove the major portion of the carbonaceous material followed by hydrogenation to reconvert the catalyst to its original state. Such regeneration may be effected continuously or intermittently either in the reactor itself (by interrupting charging stock flow) or in external vessels provided for this purpose.

The reactor itself may be of various designs but in this case it consists of a cylindrical vessel about 24 feet in diameter and about 40 to 50 feet in height, the upper portion thereof being preferably enlarged to expedite the settling of catalyst particles from ascending gases. To provide for heat removal 3-inch outside diameter tubes 47 may be secured at their upper ends in header plate 48, the tubes being closed at their lower end and open at their upper end. These tubes may be geometrically arranged throughout the cross-sectional area of the reactor on centers of at least 6 inches so that the tube surfaces will be about 3 inches apart; if heat exchange surfaces are too closely spaced proper fluidization and turbulence is interfered with and difficulties are encountered in proper operation of the unit. Tubes 49 may be about 1-inch ID and they extend concentrically downwardly in tubes 47 to a point adjacent the closed ends thereof. The upper ends of tubes 49 are secured by welding or otherwise to header plate 50 and the top 51 of the reaction vessel forms with header plate 50 a distributing reservoir for cooling fluid which passes downwardly through tubes 49, then upwardly through tubes 47 (and around tubes 49) to the space between headers 48 and 50 and thence through line 52 to vessel 53. The cooling fluid may be a liquid which vaporizes at a temperature below but within 50° F. of the desired conversion temperature but it is preferred to simply introduce water under controlled pressure for the generation of steam. Water may be preheated by reactor effluent and introduced through line 54 to vessel 53. Hot water passes through line 55 to various portions of the reservoir between header 50 and vessel top 51. Steam is discharged through line 56. It should be understood of course that other methods of removing heat may be employed without departing from the invention.

A distributor grid 57 may be employed at the base of the reactor sufficiently below the bottoms of tubes 47 to allow for thermal expansion and this distributor grid may be provided with openings of such size and shape as to prevent the catalyst particles from passing downwardly therethrough against the upflowing gases. Baffles 58 may be employed in addition to the grid for effecting gas distribution. Alternatively the distributor grid may be omitted, the cooling tubes may extend to approximately the base of the reacter and the incoming gases may be introduced at spaced points at the base of the reactor for obtaining proper distribution.

The reactor of the type hereinabove described is claimed in a copending U. S. application Serial No. 569,413, filed by Eric H. Reichl on December 22, 1944.

The synthesis reaction in this particular case is effected at a temperature of about 600° F. and a pressure of about 250 pounds per square inch. To handle about 400,000,000 cubic feet per day of total gas charged this reactor may have a diameter of approximately 24 feet so that it will have a cross-sectional area of about 450 square feet which allowing about 20% for cooling tube area gives an effective cross-sectional area of about 360 square feet. Under conversion conditions this will give a vertical gas velocity to the reactor of about 1.6 feet per second the amount of catalyst in the reactor based on iron content should be one pound of iron catalyst for each 5 to 15, e. g. about 10 cubic feet per hour of carbon monoxide charged so that in this case the reactor will contain approximately 200,000 to 250,000 pounds of catalyst. The fluidized density of the catalyst may be about 55 pounds per cubic feet so that the depth of the dense phase fluidized bed may be approximately 10 feet. Initially the fluidized suspended dense catalyst mass may only be 7 or 8 feet in depth and after the catalyst has decreased in density because of carbonaceous accumulations thereon the depth of the fluidized dense phase catalyst may be 15 or even 20 feet or more, the important considerations being that catalyst at all times remain in a dense phase turbulent fluidized condition and that the amount of iron catalyst being within the range above specified.

If a liquid is used for a cooling or diluent effect, it should be sprayed into the dense phase as very small droplets which may be suspended in the upflowing gases in much the same way as catalyst is suspended therein and which almost instantaneously cause a partial wetting of the particles and a cooling thereof by vaporization therefrom. Introduction of a large mass of liquid at one point should be avoided since this will lead to an undue wetting of the catalyst particles which in turn may disrupt the fluidization by causing agglomeration. Hydrocarbon liquid may be introduced through any one or more of lines 59—59''' through distributors 60—60''' the amount introduced at any point being determined by the relative amount of reaction and consequent gas shrinkage at that point. An inert cooling gas may be introduced through line 61. Catalyst may be recycled through standpipe 62 with incoming charge to preheat said charge to approximately reaction temperature and to promote catalyst circulation. If a large proportion of the heat is thus employed for preheating the charge gases, simple calculation will show that large amounts of the catalyst will have to be so circulated.

To minimize carry-over of catalyst solids from the reactor the upper part of the reactor may be of larger diameter to increase the effectiveness of gravity settling and cyclone separators 63 may be mounted in this upper enlarged portion to knock back the separated solids through dip leg 64. In a reactor designed to operate at super atmospheric pressure considerable savings may be effected by mounting the cyclones inside the reactor and any number of such cyclones may be employed. Alternatively or additionally however such cyclones may be mounted outside the reactor as illustrated by cyclone 65 and dip leg 66.

The effluent reactor stream after removal of catalyst solids therefrom passes by line 67 to a partial condensing system 68 and separator 69. The partial condensation may be effected in a water cooled exchanger or in a scrubber wherein the product stream is countercurrently contacted with a cooled portion of the product or other relatively cool scrubbing liquid. For effecting condensation of components substantially higher boiling than water this condensed hydrocarbon fraction higher boiling than water may be introduced through line 70 to a fractionator 71, the heaviest components may be withdrawn from the base of this fractionator through line 72 and any catalyst particles may be separated therefrom and returned to the reactor by known means. The overhead from the fractionator is condensed in cooler 73 and introduced into receiver 74. A part of the liquid from this receiver is returned by pump 75 through line 76 for reflux in the fractionator, a portion may be withdrawn through line 77 and a portion may be introduced through line 78 to one or more of lines 59—59''' for injection into the dense catalyst phase as hereinabove described.

Uncondensed gases and vapors from separator 69 pass by line 79 and cooler 80 to second separator 81 from which water and water-soluble materials may be withdrawn through line 82 and condensed hydrocarbons may be withdrawn through line 83. Uncondensed gases and vapors from the top of this separator may be scrubbed with water in tower 84, with water and water-recoverable materials being withdrawn through line 85. Gases from scrubber 84 pass either by lines 86 and 87 to compressor 88 which discharges into recycle line 43 or by lines 86 and 89 to absorber 90, into the top of which absorber oil is introduced through line 91. Unabsorbed gases leave the top of the absorber through line 92 and a portion of these gases is continuously or intermittently vented from the system through line 93 as tail gas. A portion of the tail gas however may be continuously recycled via lines 92, 94, compressor 88 and line 43 to the reactor in amounts controlled by valve 95.

Rich oil from the base of the absorber is passed by pump 96, (although a pump here may not be necessary) heat exchanger 97 and heater 98 to still 99 which is provided with a conventional reboiler 100. Lean oil from the base of the still may be returned by line 91, heat exchanger 97, pump 96' and cooler 101 back to the top of the absorber 90. Any conventional absorber oil may be employed in this system the preferred oil being that actually produced in the system such for example as hydrocarbons from lines 77 or 83, or heavy hydrocarbon components introduced thereto through line 89.

The overhead from still 99 passes by line 102 to condenser 103 and receiver 104. Gases from the top of this receiver may be recycled through line 105 to absorber 90. A portion of the condensate from receiver 104 is returned by pump 106 and line 107 to serve as reflux in still 99. The rest of the condensate may be withdrawn through line 108 or passed by line 109 for admixture with hydrocarbons from lines 77, 83, etc. The above fractionation system has been schematically illustrated and it should be understood that any conventional fractionation system may be employed. Hydrocarbons boiling in the gasoline boiling range may be segregated in such system (or later separated) and contacted with a suitable catalyst such as silica alumina catalyst or bauxite at a temperature of about 800 to 1000° F., at a pressure of about atmospheric to 50 pounds per square inch and with a space velocity of about 2 to 20 liquid volumes per hour per volume of catalyst to improve the octane number of the product and to convert any oxygen compounds contained in such fractions into hydrocarbons. Also normally gaseous olefins from the system may be polymerized or alkylated by known means to still further augment the ultimate yield of high quality gasoline. The aqueous materials withdrawn through lines 82 and 87 contain valuable chemicals which may be separated by known means or means now being developed and which may serve as valuable by-products of the synthol operation.

By operating in the manner above described the objects of the invention may be accomplished. By maintaining the carbon monoxide content of the total synthesis gas feed to the reactor below 15% and preferably not more than 12 mol percent, by maintaining an $H_2:CO:CO_2$ ratio in said total feed at about 3:1:2 or within the range of 2–6:1:1–3, and by maintaining $$\frac{(H_2)(CO_2)}{(CO)^2}$$

at about 6 or within the range of 3 to 9, the reaction is directed to substantially eliminate conversion of carbon monoxide to carbon dioxide in the conversion step, maximum production of desired products is obtained, and the problem of catalyst defluidization is effectively solved. Catalyst life is enormously lengthened, yields of valuable products are obtained far in excess of those heretofore believed to be possible. The synthesis process has been made practicable for commercial use.

While the invention has been described in connection with a specific example it should be understood that it is not limited thereto and that the example is merely illustrative. Where the fresh make gas contains relatively large amounts of nitrogen, still larger amounts of nitrogen may be recycled and the amount of CO in the total synthesis feed gas may be relatively low. Where a source of $CO_2$ is available, it may be used as the fresh synthesis gas diluent (introduced through line 44) and in this case no recycle of tail gas may be necessary. This external carbon dioxide may be obtained from flue gases from preheater 27 or from the regeneration of catalyst employed for treating the hydrocarbon product. Highly active iron catalysts may require a somewhat lower carbon monoxide content than less active catalysts but in most cases under normal operating conditions the optimum total synthesis gas feed will be as hereinabove defined. If the diluent or recycled gas required for obtaining the defined proportions is not sufficient to maintain the vertical gas velocities in the synthesis zone at least as great as about 1 ft. per second, additional gas or vaporizable liquid may be introduced into the dense catalyst phase in order to prevent defluidization. Various modifications and alternative operating procedures and operating conditions will be apparent from the above description to those skilled in the art.

We claim:

1. The method of effecting synthesis with a promoted iron catalyst of small particle size, which method comprises preparing a fresh synthesis gas charge having an $H_2:CO$ ratio in the range of about 1.8:1 to 2:1 and containing only a minor amount of $CO_2$, steam, carbon and other components, cooling and scrubbing said charge with water for removing steam and carbon, diluting said charge with sufficient recycle gas hereinafter described to obtain a total synthesis gas charge containing approximately 10 to 15 mol per cent CO and having an $H_2:CO:CO_2$ ratio of about 2–6:1:1–3 and a Z number in the range of about 3 to 9 where the Z number is the quotient of mol per cent $H_2$ multiplied by mol per cent $CO_2$ and divided by the square of the mol per cent CO, withdrawing a large stream of hot catalyst at substantially reaction temperature from the reaction zone, suspending said hot catalyst in said cooled total gas charge to increase the temperature of said charge and passing said charge upwardly through a dense phase fluidized suspension of said catalyst particles in a reaction zone at a temperature in the range of about 550° F. to about 675° F. at a pressure higher than 150 pounds per square inch and at a rate for maintaining the catalyst in fluidized condition and effecting synthesis, centrifugally separating entrained catalyst particles from gases in the upper part of the reaction zone and returning the separated particles directly to said dense phase, cooling the gases from the centrifugal separation step and removing most of the normally liquid components therefrom by condensation, scrubbing uncondensed gases with water, passing at least a part of the scrubbed gases through an absorber for recovering hydrocarbons from tail gas, compressing scrubbed gas, at least a portion of which is tail gas, to form said recycle gas and returning said compressed recycle gas for admixture with water-scrubbed fresh synthesis gas charge whereby the total gas charge prior to suspending catalyst is at a low temperature so that a portion of the heat of reaction which is stored in this catalyst as sensible heat is utilized in heating the total charging stock almost to reaction temperature.

2. The method of claim 1 which includes the step of withdrawing hot fluidized catalyst from the upper part of the dense phase in the reaction zone.

3. The method of claim 1 wherein the space velocity in the reaction zone corresponds to about 5 to 15 cubic feet of carbon monoxide per hour (measured at atmospheric pressure at 60° F.) per pound of iron catalyst in the reaction zone.

JOHN A. PHINNEY.
BENJAMIN S. PACE.
GEORGE R. AYTON.

REFERENCES CITED

The following references are of record in the file of this patent:

UNITED STATES PATENTS

| Number | Name | Date |
| --- | --- | --- |
| 1,984,380 | Odell | Dec. 18, 1934 |
| 2,231,990 | Dreyfus | Feb. 18, 1941 |
| 2,274,064 | Howard et al. | Feb. 24, 1942 |
| 2,324,172 | Parkhurst | July 13, 1943 |
| 2,347,682 | Gunness | May 2, 1944 |
| 2,414,276 | Sensel et al. | Jan. 14, 1947 |
| 2,417,164 | Huber | Mar. 11, 1947 |
| 2,436,568 | Griffin et al. | Feb. 24, 1948 |
| 2,436,957 | Eastman | Mar. 2, 1948 |
| 2,436,962 | Gaucher | Mar. 2, 1948 |
| 2,472,219 | Lyons | June 7, 1949 |